United States Patent
Yokokawa

(10) Patent No.: US 7,079,462 B2
(45) Date of Patent: *Jul. 18, 2006

(54) OPTICAL DISK DATA ERASING APPARATUS AND OPTICAL DISK DATA ERASING METHOD

(75) Inventor: Tsuyoshi Yokokawa, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/984,934

(22) Filed: Nov. 10, 2004

(65) Prior Publication Data

US 2005/0094521 A1  May 5, 2005

Related U.S. Application Data

(62) Division of application No. 09/973,690, filed on Oct. 11, 2001, now Pat. No. 6,834,034.

(30) Foreign Application Priority Data

Feb. 21, 2001 (JP) .............................. 2001-44451

(51) Int. Cl.
G11B 7/00 (2006.01)

(52) U.S. Cl. ............................ 369/53.22; 369/53.24; 369/53.37

(58) Field of Classification Search ...................... None
See application file for complete search history.

(56) References Cited

U.S. PATENT DOCUMENTS

| | | | |
|---|---|---|---|
| 4,825,419 | A | 4/1989 | Ohtomo |
| 5,508,986 | A | 4/1996 | Kagamibashi et al. |
| 5,561,825 | A | 10/1996 | Yamagami et al. |
| 5,956,311 | A | 9/1999 | Kawai |
| 6,091,686 | A | 7/2000 | Caffarelli et al. |
| 6,226,241 | B1 | 5/2001 | D'Amato et al. |
| 6,377,526 | B1 | 4/2002 | Vining et al. |

FOREIGN PATENT DOCUMENTS

| | | |
|---|---|---|
| EP | 0273421 | 7/1988 |
| EP | 730274 | 9/1996 |
| JP | 63-167428 | 7/1988 |
| JP | 63-229626 | 9/1988 |

(Continued)

*Primary Examiner*—Brian E. Miller
*Assistant Examiner*—Peter Vincent Agustin
(74) *Attorney, Agent, or Firm*—Wenderoth, Lind & Ponack, L.L.P.

(57) ABSTRACT

In an optical disk data erasing apparatus, it is judged whether a loaded optical disk is a write-once optical disk or not, and when the optical disk is a write-once optical disk, disk recording information of the optical disk is obtained according to an instruction from a host computer, and overwriting of the optical disk is performed by irradiating the optical disk with a laser beam having a recording power equal to or higher than that at recording, thereby erasing data recorded on the optical disk. Therefore, the optical disk data erasing apparatus can completely erase the data recorded on the optical disk, easily and inexpensively, without having to use a special apparatus, and without generating substances detrimental to environment.

10 Claims, 6 Drawing Sheets

FOREIGN PATENT DOCUMENTS

| | | |
|---|---|---|
| JP | 63-273242 | 11/1988 |
| JP | 1-213834 | 8/1989 |
| JP | 03116535 | 5/1991 |
| JP | 04010261 | 1/1992 |
| JP | 5-290381 | 11/1993 |
| JP | 6-84272 | 3/1994 |
| JP | 7-13905 | 1/1995 |
| JP | 10214424 | 8/1998 |
| JP | 8-273334 | 7/2000 |
| JP | 2001-014681 | 1/2001 |
| JP | 2001-209944 | 8/2001 |
| KR | 1996-0019216 | 6/1996 |
| KR | 1998-059923 | 10/1998 |

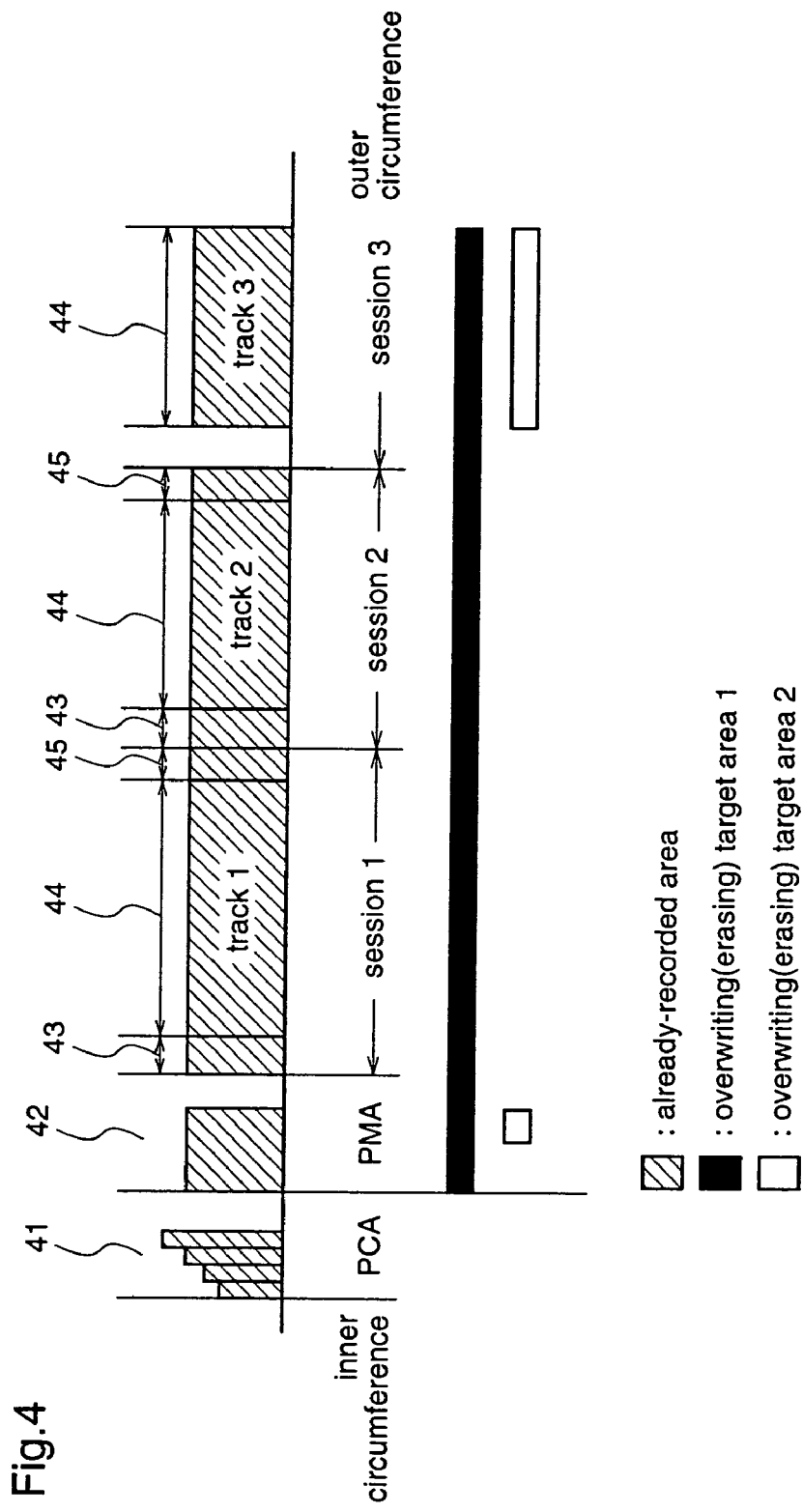

OPTICAL DISK DATA ERASING APPARATUS AND OPTICAL DISK DATA ERASING METHOD

This application is a DIV of Ser. No. 09/973,690 Oct. 11, 2001 U.S. Pat. No. 6,834,034

FIELD OF THE INVENTION

The present invention relates to an apparatus and a method for erasing data from an optical disk.

BACKGROUND OF THE INVENTION

A CD-R disk is a typical write-once optical disk, and a user can write data on the CD-R disk only once. However, when the CD-R disk becomes unnecessary, it is not easy to erase the written data from the CD-R disk. Therefore, the CD-R disk is put in the unplayable state by using a disposal method such as artificially applying a stress to the disk (folding, breaking, or damaging the disk) or changing the media characteristics under high temperature condition, whereby secret information recorded on the disk is prevented from leaking.

However, the conventional data erasing method relating to the write-once optical disk has the following drawbacks.

1) Reliability is insufficient, that is, it is uncertain whether the disk is completely unplayable or not.

2) The cost is high.

3) Erasing of data limited to a specific recording area cannot be carried out.

4) Substances deleterious to the environment are released.

It is expected that the CD-R disk market will become widespread in the future and, therefore, development of simple cannot be carried out.

4) Substances detrimental to the environment are released.

It is expected that the CD-R disk market will become widespread in the future and, therefore, development of a simple and low-cost method and apparatus for completely erasing recorded data from the CD-R disk has been desired.

SUMMARY OF THE INVENTION

The present invention is made to solve the above-described problems and has for its object to provide an apparatus and a method for completely erasing recorded data from write-once optical disks.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an optical disk data erasing apparatus which is an optical disk recording apparatus for writing or reading data in/from a recordable optical disk by irradiating the optical disk with a laser beam, the optical disk recording apparatus being connected to a host computer through an interface bus. The optical disk data erasing apparatus comprises: a judgement means for judging as to whether a loaded optical disk is a write-once optical disk or not; an instruction recognition means for recognizing an instruction from the host computer; and an erasing means for executing a data erasing process on the basis of the instruction; wherein the erasing means overwrites the optical disk which is judged as a write-once optical disk by the judgement means, by irradiating the optical disk with a laser beam having the same recording power as that at recording, thereby erasing data recorded on the optical disk. Therefore, an optical disk data erasing apparatus which is able to completely erase data on an optical disk is easily realized at low cost, without having to use a special apparatus, and without generating substances detrimental to environment, whereby leakage of secret information can be prevented when the optical disk is discarded.

According to a second aspect of the present invention, there is provided an optical disk data erasing apparatus which is an optical disk recording apparatus for writing or reading data in/from a recordable optical disk by irradiating the optical disk with a laser beam, the optical disk recording apparatus being connected to a host computer through an interface bus. The optical disk data erasing apparatus comprises: a judgement means for making a judgement as to whether a loaded optical disk is a write-once optical disk or not; an instruction recognition means for recognizing an instruction from the host computer; and an erasing means for executing a data erasing process on the basis of the instruction; wherein the erasing means overwrites the optical disk which is judged as a write-once optical disk by the judgement means, by irradiating the optical disk with a laser beam having a recording power higher than that at recording, thereby erasing data recorded on the optical disk. Therefore, an optical disk data erasing apparatus which is able to completely erase data on an optical disk is easily realized at low cost, without having to use a special apparatus, without generating substances detrimental to environment, whereby leakage of secret information can be prevented when the optical disk is discarded.

According to a third aspect of the present invention, the optical disk data erasing apparatus according to the first or second aspect further comprises a disk recording information acquisition means for acquiring disk recording information relating to a data-recorded area or a data-unrecorded area of the write-once optical disk, on the basis of a disk recording information acquisition instruction which is issued by the host computer; wherein the erasing means erases data recorded in the data-recorded area. Therefore, the data erasing process can be performed on only the data-recorded area, while the data-unrecorded area, which needs not be erased, is outside the target of the erasing process, whereby the time required for the erasing process is reduced.

According to a fourth aspect of the present invention, the optical disk data erasing apparatus according to the third aspect further comprises a determination means for determining whether data are recorded on the write-once optical disk or not, on the basis of the disk recording information which is obtained by the disk recording information acquisition means; wherein, when data are recorded on the write-once optical disk, the erasing means executes the recorded-data erasing process; and when no data are recorded on the optical disk, the determination means returns an error signal to the host computer to notify the user that the data erasing process is not going to be executed. Therefore, when no data are recorded on the optical disk, the user can know that there is no need to execute the data erasing process on the disk, whereby the user can perform the erasing process on only a data-recorded optical disk, without performing an unnecessary erasing process.

According to a fifth aspect of the present invention, the optical disk data erasing apparatus according to the third aspect further comprises: a notification means for notifying the user of the disk recording information which is obtained by the disk recording information acquisition means, through the host computer; and an erasing area detection means for detecting, when an instruction which specifies a data erasing area is issued from the user through the host computer on the basis of the disk recording information, an area corresponding to the specified data erasing area on the basis of the instruction; wherein the erasing means erases the data recorded in the erasing area which is detected by the erasing area detection means. Therefore, the user can know the erasable data area in the loaded optical disk and, as the result, the user can specify a desired area to be erased.

According to a sixth aspect of the present invention, the optical disk data erasing apparatus according to the first or second aspect further comprises: a setting means with which the user sets, through the host computer, whether the interface bus is to be occupied or not during execution of the data erasing process; and a monitor means for monitoring the data erasing state on the basis of a state monitoring instruction which is periodically issued from the host computer, when it is set that the interface bus is not to be occupied; wherein the host computer is able to execute another process during execution of the data erasing process, when it is set that the interface bus is not to be occupied. Therefore, when the user sets that the interface bus is not to be occupied, the host computer can execute another process while the optical disk data erasing apparatus executes the data erasing process. Further, when the interface bus is to be occupied, the host computer can speedily detect the end of the erasing process of the optical disk data erasing apparatus.

According to a seventh aspect of the present invention, there is provided an optical disk data erasing apparatus which is an optical disk recording apparatus for writing or reading data in/from a recordable optical disk by irradiating the optical disk with a laser beam. The optical disk data erasing apparatus comprises: a first jumper switch setting means for setting ON/OFF of a first jumper switch; a setting identification means for identifying the setting of the first jumper switch; a judgement means for making a judgement as to whether a loaded optical disk is a write-once optical disk or not; an erasing means for overwriting the write-once optical disk by irradiating the optical disk with a laser beam having the same recording power as that at recording, according to the setting of the first jumper switch, thereby erasing data recorded on the optical disk; and an ejection means for automatically ejecting the optical disk after the data erasing process; wherein, when the first jumper switch is turned ON, the erasing means starts the data erasing operation; and when the first jumper switch is OFF or when the judgement means judges that the loaded optical disk is not a write-once optical disk, the ejection means automatically ejects the optical disk, and a display means displays that the data erasing process is not to be executed on the optical disk. Therefore, the optical disk data erasing process can be performed by the optical disk data erasing apparatus alone, according to an external control, without using the host computer. Further, since the data erasing process is automated, an optical disk data erasing apparatus capable of erasing recorded data completely is realized easily, at low cost, whereby leakage of secret information is prevented when the optical disk is discarded.

According to an eighth aspect of the present invention, there is provided an optical disk data erasing apparatus which is an optical disk recording apparatus for writing or reading data in/from a recordable optical disk by irradiating the optical disk with a laser beam. The optical disk data erasing apparatus comprises: a first jumper switch setting means for setting ON/OFF of a first jumper switch; a setting identification means for identifying the setting of the first jumper switch; a judgement means for making a judgement as to whether a loaded optical disk is a write-once optical disk or not; an erasing means for overwriting the write-once optical disk by irradiating the optical disk with a laser beam having a recording power higher than that at recording, according to the setting of the first jumper switch, thereby erasing the data recorded on the optical disk; and an ejection means for automatically ejecting the optical disk after the data erasing process; wherein, when the first jumper switch is turned ON, the erasing means starts the data erasing operation; and when the first jumper switch is OFF or when the judgement means judges that the loaded optical disk is not a write-once optical disk, the ejection means automatically ejects the optical disk, and display means displays that the data erasing process is not to be executed on the optical disk. Therefore, the optical disk data erasing process can be performed by the optical disk data erasing apparatus alone, according to an external control, without using the host computer. Further, since the data erasing process is automated, an optical disk data erasing apparatus capable of erasing recorded data completely is realized easily, at low cost, whereby leakage of secret information is prevented when the optical disk is discarded.

According to a ninth aspect of the present invention, the optical disk data erasing apparatus according to the seventh or eighth aspect further comprises a checking means for checking whether the data erasing process has normally ended or not; wherein, when the data erasing process for the write-once optical disk has not normally ended, the ejection means automatically ejects the optical disk, and the display means displays that the data erasing process had not been executed on the optical disk. Therefore, when the data erasing process has not ended normally, the loaded disk is automatically ejected, and the display means displays that the data erasing process has not been executed. Thereby, the user is prevented from recognizing that the erasing process has normally ended, and from discarding the optical disk in which data to be erased has not been erased.

According to a tenth aspect of the present invention, the optical disk data erasing apparatus according to the ninth aspect further comprises a second jumper switch setting means for setting ON/OFF of a second jumper switch; wherein the setting identification means identifies the setting of the second jumper switch; when it is identified that the second jumper switch is ON, the erasing means executes the data erasing process over the entire surface of the optical disk; and when it is identified that the second jumper switch is OFF, the erasing means executes the data erasing process on a final session. Therefore, the user can select the erasing method according to the setting of the second jumper switch, and when there is no need to erase the data over the entire surface of the disk, the second jumper switch is turned off to prevent unnecessary entire-surface erasing from being executed. As the result, the time required for the erasing process is reduced, resulting in a low-cost optical disk data erasing apparatus.

According to an eleventh aspect of the present invention, the optical disk data erasing apparatus according to the seventh or eighth aspect further comprises a disk recording information acquisition means for acquiring information relating to a data-recorded area or a data-unrecorded area of the write-once optical disk; wherein the erasing means erases recorded data from the data-recorded area. Therefore, the data erasing process can be performed on only the data-recorded area, while the data-unrecorded area, which needs not be erased, is outside the target of the erasing process, whereby the time required for the erasing process is reduced.

According to a twelfth aspect of the present invention, the optical disk data erasing apparatus according to the eleventh aspect further comprises a determination means for determining whether data are recorded on the write-once optical disk or not, on the basis of the disk recording information obtained by the disk recording information acquisition means; wherein, when data are recorded on the write-once optical disk, the erasing means executes the recorded-data erasing process; and when no data are recorded on the write-once optical disk, the ejection means automatically ejects the optical disk, and the display means displays that the data erasing process is not to be executed on the optical disk. Therefore, when no data are recorded on the optical disk, the loaded disk is automatically ejected, and the display means displays that the data erasing process has not been executed, whereby the user knows that there is no need to execute the data erasing process, and performs the data erasing process on only a data-recorded optical disk, without performing an unnecessary erasing process.

According to a thirteenth aspect of the present invention, an optical disk data erasing method comprises: a judgement step of making a judgement as to whether a loaded optical disk is a write-once optical disk or not; an instruction recognition step of recognizing an instruction from a host computer; and a data erasing step of overwriting the optical disk which is judged as a write-once optical disk in the judgement step, by irradiating the optical disk with a laser beam having the same recording power as that at recording, on the basis of the instruction, thereby erasing data recorded on the optical disk. Therefore, data on an optical disk can be completely erased easily, at low cost, without having to use a special apparatus, and without generating substances detrimental to environment, whereby leakage of secret information can be prevented when the optical disk is discarded.

According to a fourteenth aspect of the present invention, an optical disk data erasing method comprises: a judgement step of making a judgement as to whether a loaded optical disk is a write-once optical disk or not; an instruction recognition step of recognizing an instruction from a host computer; and an erasing step of overwriting the optical disk which is judged as a write-once optical disk in the judgement step, by irradiating the optical disk with a laser beam having a recording power higher than that at recording, on the basis of the instruction, thereby erasing data recorded on the optical disk. Therefore, data on an optical disk can be completely erased easily, at low cost, without having to use a special apparatus, and without generating substances detrimental to environment, whereby leakage of secret information can be prevented when the optical disk is discarded.

According to a fifteenth aspect of the present invention, the optical data erasing method according to the thirteenth or fourteenth aspect further comprises: a disk recording information acquisition instruction step of issuing a disk recording information acquisition instruction from the host computer; and a disk recording information acquisition step of acquiring information relating to a data-recorded area or a data-unrecorded area of the write-once optical disk, on the basis of the disk recording information acquisition instruction; wherein data recorded in the data-recorded area are erased in the erasing step. Therefore, the data erasing process can be performed on only the data-recorded area, while the data-unrecorded area, which needs not be erased, is outside the target of the erasing process, whereby the time required for the erasing process is reduced.

According to a sixteenth aspect of the present invention, the optical disk data erasing method according to the fifteenth aspect further comprises a determination step of determining whether data are recorded on the write-once optical disk or not, on the basis of the disk recording information which is obtained in the disk recording information acquisition step; wherein, when data are recorded on the write-once optical disk, the recorded data are erased in the erasing step; and when no data are recorded on the optical disk, an error signal is returned to the host computer in the determination step to notify the user that the data erasing process has not been executed on the optical disk. Therefore, when no data are recorded on the optical disk, the user can know that there is no need to execute the data erasing process on the disk, whereby the user can perform the erasing process on only a data-recorded optical disk, without performing an unnecessary erasing process.

According to a seventeenth aspect of the present invention, the optical disk data erasing method according to the fifteenth aspect further comprises: a notification step of notifying the user of the disk recording information which is obtained in the disk recording information acquisition step, through the host computer; an erasing area specification instruction step in which the user issues an instruction for specifying a data erasing area, on the basis of the disk recording information, through the host computer; and an erasing area detection step of detecting, from the data-recorded area obtained in the disk recording information acquisition step, an area corresponding to the specified erasing area on the basis of the instruction; wherein data recorded in the erasing area, which is detected by the erasing area detection means, are erased in the erasing step. Therefore, the user can know the erasable data area in the loaded optical disk and, as the result, the user can specify a desired area to be erased.

According to an eighteenth aspect of the present invention, the optical disk data erasing method according to the thirteenth or fourteenth aspect further comprises: a setting step in which the user sets, through the host computer, whether an interface bus is to be occupied or not during execution of the data erasing process; a monitoring instruction step of periodically issuing an erasing state monitoring instruction from the host computer, when it is set that the interface bus is not to be occupied; and a monitoring step of monitoring the data erasing state on the basis of the erasing state monitoring instruction. Therefore, when the user sets that the interface bus is not to be occupied, the host computer can execute another process while the optical disk data erasing apparatus executes the data erasing process. Further, when the interface bus is to be occupied, the host computer can speedily detect the end of the erasing process of the optical disk data erasing apparatus.

According to a nineteenth aspect of the present invention, an optical disk data erasing method comprises: a first jumper switch setting step of setting ON/OFF of a first jumper switch; a setting identification step of identifying the setting of the first jumper switch; a judgement step of making a judgement as to whether a loaded optical disk is a write-once optical disk or not; an erasing step of overwriting the write-once optical disk by irradiating the optical disk with a laser beam having the same recording power as that at recording, according to the setting of the first jumper switch, thereby erasing data recorded on the optical disk; and an ejection step of automatically ejecting the optical disk after the data erasing process; wherein, when the first jumper switch is ON, the erasing step starts the data erasing operation; and when the first jumper switch is OFF or when it is judged in the judgement step that the loaded optical disk is not a write-once optical disk, the optical disk is automatically ejected in the ejection step, and it is displayed, in a display step, that the data erasing process has not been executed on the optical disk. Therefore, the optical disk data erasing process can be performed by the optical disk data erasing apparatus alone, according to an external control, without using the host computer. Further, since the data erasing process is automated, recorded data can be completely erased easily, at low cost, whereby leakage of secret information is prevented when the optical disk is discarded.

According to a twentieth aspect of the present invention, an optical disk data erasing method comprises: a first jumper switch setting step of setting ON/OFF of a first jumper switch; a setting identification step of identifying the setting of the first jumper switch; a judgement step of making a judgement as to whether a loaded optical disk is a write-once optical disk or not; an erasing step of overwriting the write-once optical disk by irradiating the optical disk with a laser beam having a recording power higher than that at recording, according to the setting of the first jumper switch, thereby erasing data recorded on the optical disk; and an ejection step of automatically ejecting the optical disk after the data erasing process; wherein, when the first jumper switch is ON, the erasing step starts the erasing operation; and when the first jumper switch is OFF or when it is judged in the judgement step that the loaded optical disk is not a write-once optical disk, the optical disk is automatically ejected in the ejection step, and it is displayed, in a display step, that the data erasing process has not been executed on the optical disk. Therefore, the optical disk data erasing process can be performed by the optical disk data erasing apparatus alone, according to an external control, without using the host computer. Further, since the data erasing process is automated, recorded data can be completely erased easily, at low cost, whereby leakage of secret information is prevented when the optical disk is discarded.

According to a twenty-first aspect of the present invention, the optical disk data erasing method according to the nineteenth or twentieth aspect further comprises a checking step of checking whether the data erasing process has ended normally or not; wherein, when the data erasing process for the write-once optical disk has not ended normally, the optical disk is automatically ejected in the ejection step, and it is displayed, in the display step, that the data erasing process has not to been executed on the optical disk. Therefore, when the data erasing process has not ended normally, the loaded disk is automatically ejected, and it is displayed that the data erasing process has not been executed. Thereby, the user is prevented from recognizing that the erasing process has normally ended, and from discarding the optical disk in which data to be erased are not erased.

According to a twenty-second aspect of the present invention, the optical disk data erasing method according to the twenty-first aspect further comprises a second jumper switch setting step of setting ON/OFF of a second jumper switch; wherein the setting of the second jumper switch is identified in the setting identification step; when it is identified that the second jumper switch is ON, the data erasing process is executed over the entire surface of the optical disk in the erasing step; and when it is identified that the second jumper switch is OFF, the data erasing process is executed on a final session in the erasing step. Therefore, the user can select the erasing method according to the setting of the second jumper switch, and when there is no need to erase the data over the entire surface of the disk, the second jumper switch is turned off to prevent unnecessary entire-surface erasing from being executed. As the result, the time required for the erasing process is reduced, resulting in a low-cost optical disk data erasing apparatus.

According to a twenty-third aspect of the present invention, the optical disk data erasing method according to the nineteenth or twentieth aspect further comprises a disk recording information acquisition step of acquiring information relating to a data-recorded area or a data-unrecorded area of the write-once optical disk; wherein data recorded in the data-recorded area are erased in the erasing step. Therefore, the data erasing process can be performed on only the data-recorded area, while the data-unrecorded area, which needs not be erased, is outside the target of the erasing process, whereby the time required for the erasing process is reduced.

According to a twenty-fourth aspect of the present invention, the optical disk data erasing method according to the twenty-third aspect further comprises a determination step of determining whether data are recorded on the write-once optical disk or not, on the basis of the disk recording information obtained in the disk recording information acquisition step; wherein, when data are recorded on the write-once optical disk, the recorded data are erased in the erasing step; and when no data are recorded on the write-once optical disk, the optical disk is automatically ejected in the ejection step, and it is displayed, in the display step, that the data erasing process has not been executed on the optical disk. Therefore, when no data are recorded on the optical disk, the loaded disk is automatically ejected, and it is displayed that the data erasing process has not been executed, whereby the user knows that there is no need to execute the data erasing process, and performs the data erasing process on only a data-recorded optical disk, without performing an unnecessary erasing process.

BRIEF DESCRIPTION OF THE DRAWINGS

FIG. 4 is a diagram illustrating an example of a disk format according to the present invention.

DETAILED DESCRIPTION OF THE PREFERRED EMBODIMENTS

Hereinafter, preferred embodiments of the present invention will be described with reference to the drawings. The embodiments described hereinafter are merely examples, and the present invention is not restricted to these embodiments.

Embodiment 1

Figure 1:
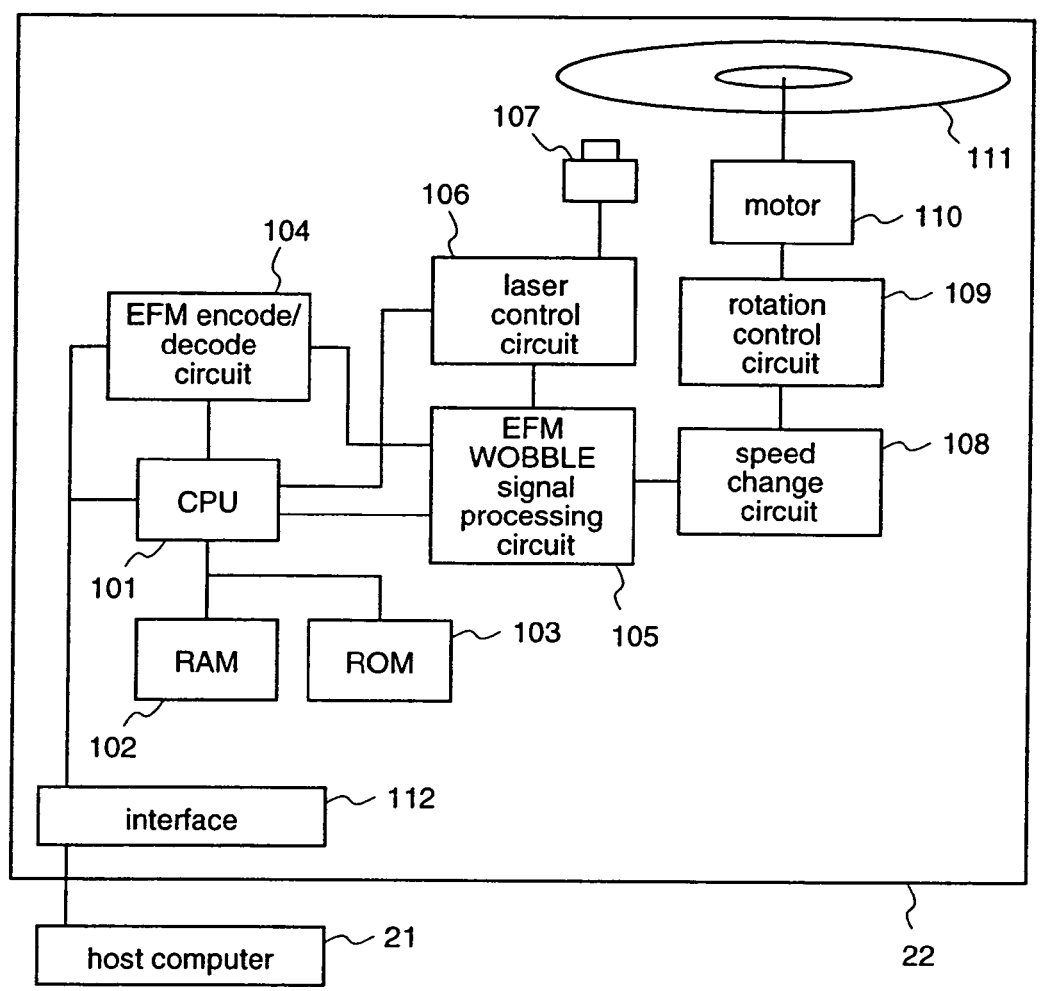
FIG. 1 is a block diagram illustrating the construction of a data erasing apparatus according to the present invention.

Hereinafter, an optical disk data erasing apparatus according to a first embodiment of the present invention will be described. FIG. 1 is a diagram illustrating the construction of an optical disk data erasing apparatus 22.

In FIG. 1, the optical disk data erasing apparatus 22 is an optical disk recording apparatus for writing or reading data in/from a recordable optical disk 111 by irradiating the optical disk with a laser beam. The optical disk data erasing apparatus 22 comprises a CPU 101, a RAM 102, a ROM 103, an EFM encoder/decoder circuit 104, an EFM WOBBLE signal processing circuit 105, a laser control circuit 106, a laser pickup 107, a speed change circuit 108, a rotation control circuit 109, and a motor 110.

The CPU 101 is provided with an instruction recognition means for recognizing an instruction from a host computer 21, and controls the respective constituents of the optical disk data erasing apparatus 22 according to a command from the ROM 103 or an instruction from the host computer 21. The RAM 102 stores data, and the ROM 103 stores a command for controlling the CPU 101. The EFM encoder/decoder circuit 104 performs encoding or decoding of various kinds of signals or data. The EFM WOBBLE signal processing circuit 105 controls a disk driving mechanism on the basis of WOBBLE information which is read from the optical disk 111. The disk driving mechanism comprises the motor 110 for rotating the optical disk 111, the speed change circuit 108 for changing the rotation speed of the motor 110, and the rotation control circuit 109 for controlling the rpm (revolutions per minute) of the motor 110.

The laser control circuit 106 performs recording of data into the optical disk 111 as well as reading of recorded data from the optical disk 111, by irradiating the optical disk 111 with a laser beam outputted from the laser pickup 107 while moving the laser pickup 107 from the inner circumference of the rotating optical disk 111 toward the outer circumference. Further, the laser control circuit 106 is provided with an erasing means for executing a data erasing process on the basis of an instruction from the host computer, whereby recorded data on the optical disk 111 is erased.

The optical disk data erasing apparatus 22 constructed as described above is provided with a judgement means for making a judgement as to whether the loaded optical disk 111 is a write-once optical disk (CD-R disk) or not; a disk recording information acquisition means for acquiring information relating to a data-recorded area or a data-unrecorded area of the CD-R disk 111 on the basis of a disk recording information acquisition instruction from the host computer 21; a notification means for notifying the user that the disk recording information is obtained, through the host computer 21; an erasing area detection means for detecting, when an instruction that specifies an area from which data are to be erased (hereinafter referred to as a data erasing area) is issued by the user through the host computer 21 on the basis of the disk recording information, an area corresponding to the specified data erasing area; and a determination means for determining whether data are recorded on the CD-R disk 111 or not, on the basis of the disk recording information.

The erasing means overwrites the optical disk 111 which is judged as a CD-R disk by the judgement means, by irradiating the optical disk 111 with a laser beam having a recording power equal to or higher than that at recording, thereby erasing the data recorded on the optical disk 111.

Figure 2:
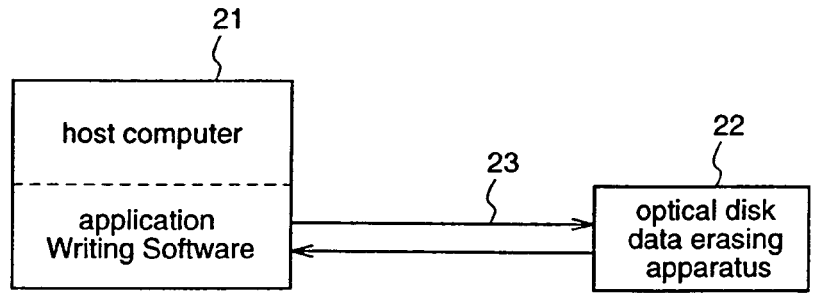
FIG. 2 is a block diagram illustrating the construction of a system according to a first or second embodiment of the present invention.

FIG. 2 is a block diagram illustrating the construction of an optical disk data erasing system according to the present invention.

In FIG. 2, the optical disk data erasing apparatus 22 and the host computer 21 are connected through an interface cable 23, and various kinds of commands are outputted from "Writing Software" that is a recording application in the host computer 21 to the data erasing apparatus 22.

FIG. 4 is a diagram illustrating an example of a disk format.

In FIG. 4, 41 denotes a PCA (Power Calibration Area) for obtaining an accurate recording power of a disk. 42 denotes a PMA (Program Memory Area) wherein information about the start time or end time of an already-recorded track or a reserved track, information for identifying the disk, and the like are stored. One session is composed of a read-in area 43, a program area 44, and a read-out area 45, and a plurality of sessions are recorded in a single disk. Recording should be carried out so that the sessions are sequentially recorded from the inner circumference of the disk toward the outer circumference.

In each session, the read-in area 43 indicates the position where data are recorded, and holds a TOC (Table of Contents) which is track information of the session. The program area 44 holds information including user data and a pass table from the immediately preceding session. The read-out area 45 indicates the end of data.

It is assumed that a session 1 and a session 2 are already closed while a session 3 is in the open state, and tracks 1~3 are recorded in the respective sessions 1~3.

When the host computer 21 outputs an instruction for erasing the entire surface of the disk, the data erasing apparatus 22 overwrites an overwrite target area 1 to erase data from the area 1. When the host computer 21 outputs an instruction for erasing only the session 3 while leaving the sessions 1 and 2 as effective data, the data erasing apparatus 22 overwrites an overwrite target area 2 to erase data from the area 2.

Next, a description will be given of a method for reading data recorded on the disk.

In the case where the disk is loaded to obtain all of track information and latest user data information (i.e., a pass table recorded in the final session), the information in the read-in area 43 at the innermost circumference is read out, and when it is judged that the loaded disk is a multi-session-recorded disk, the disk is searched for all of track information up to the final session and the pass table in the final session.

As a method of searching the disk for all of track information up to the final session, there is a method of sequentially reading the read-in areas of the respective sessions. In this method, initially, the TOC information in the read-in area 43 of the session 1 is read, and the read-in area 43 of the session 2 is accessed on the basis of the obtained program start time of the session 2 to read the TOC information of the session 2 and, thereafter, the read-in area 43 of the session 3 is accessed on the basis of the obtained program start time of the session 3. Since there is no data in the read-in area 43 of the session 3, this area is judged as an unrecorded area, and the previous session 2 is judged as the final session. When all of track information up to the final session is obtained, access is made to, for example, the pass table of the final session on the basis of the track information of the final session, thereby obtaining the pass table of the final session or the like.

Figure 5:
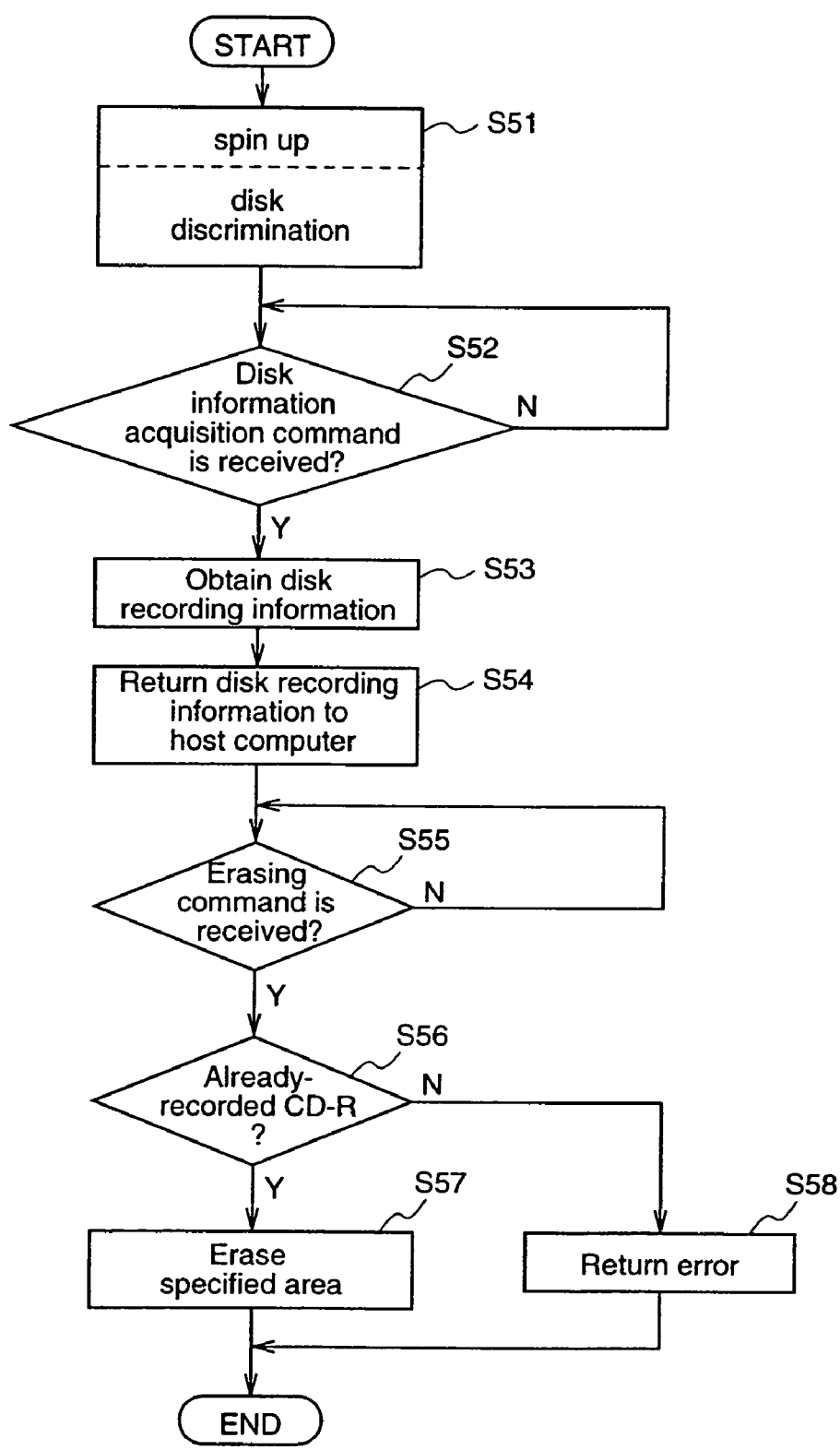
FIG. 5 is a flowchart illustrating the procedure of a data erasing method according to the first embodiment of the present invention.

Next, an optical disk data erasing method according to the first embodiment will be described with reference to FIG. 5.

When the optical disk 111 is loaded on the data erasing apparatus 22, initially, the CPU 101 controls the rotation control circuit 109 to spin up the motor 110 in step S51. Then, the loaded optical disk 111 is irradiated with a laser beam to read data recorded on the optical disk 111, and it is checked whether the optical disk 111 is a CD-R disk or not, on the basis of WOBBLE information which is obtained through the EFM WOBBLE signal processing circuit 105, followed by step S52.

In step S52, it is checked whether or not the data erasing apparatus 22 receives a disk recording information acquisition command (a command of "Read Disk Information" or "Read Track Information") which is issued from the host computer 21. When the apparatus 22 receives this command, the process goes to step S53.

The disk recording information is obtained as follows. The outline of the disk recording state is grasped on the basis of the information about the start time and end time of the already-recorded track and reserved track, which information is recorded in the PMA 42 at the inner circumference of the disk 111, and the TOC information which is recorded in the read-in area 43 of each session, and a break of pits between the data-recorded area and the data-unrecorded area is actually detected to obtain the details of the disk recording state, whereby the disk recording information is obtained.

Next, in step S54, disk recording information adapted to the disk recording information acquisition command (a command of "Read Disk Information" or "Read Track Information") is returned to the host computer 21 to notify the user of the data recording information. Thereby, the user can specify a desired erasing area.

Next, in step S55, it is checked whether the data erasing apparatus 22 receives an erasing command which is issued from the host computer 21. When the apparatus 22 receives this command, the process goes to step S56.

Next, in step S56, it is determined whether data have already written in the loaded optical disk 111 or not. When the optical disk 111 is determined as an already-recorded CD-R disk, the process goes to step S57. Otherwise, the process goes to step S58.

In step S57, the erasing area S53 specified by the erasing command is compared with the recording area obtained in step S53, and only the recording area corresponding to the specified erasing area is irradiated with a laser beam having a recording power equal to or higher than that at recording to overwrite the recording area, whereby data recorded in the specified area are erased. In this way, the user can erase only a desired area.

When an optical disk other than the already-recorded CD-R disk is loaded, the erasing command becomes invalid and, in step S58, an error signal indicating that the loaded disk is an inerasable disk is returned to the host computer 21. Since there is no need to execute data erasing when no data are recorded on the optical disk 111, needless operation is avoided, resulting in reduced cost.

As described above, in the optical disk data erasing apparatus according to the first embodiment, it is judged whether the loaded optical disk 111 is a write-once disk (CD-R disk) or not, and when it is a write-once disk, overwriting is carried out by irradiating the optical disk 111 with a laser beam having a recording power equal to or higher than that at recording, thereby erasing data recorded on the optical disk 111. Therefore, an optical disk data erasing apparatus which is able to completely erase data recorded on an optical disk is realized easily, at low cost, without having to use a special apparatus and without generating substances detrimental to environment, whereby leakage of secret information can be prevented when the disk is discarded.

Further, when the host computer 21 issues a disk recording information acquisition instruction, disk recording information relating to a data-recorded area or a data-unrecorded area of the optical disk 111 is obtained. Therefore, data erasing can be performed on only the data-recorded area, while the data-unrecorded area, which needs not be erased, is outside the target of data erasing, whereby the time required for data erasing is reduced.

Embodiment 2

Hereinafter, an optical disk data erasing apparatus according to a second embodiment of the present invention will be described. FIG. 1 is a block illustrating the construction of an optical disk data erasing apparatus according to the second embodiment. FIG. 2 is a block diagram illustrating the construction of a data erasing system according to the second embodiment. FIG. 4 is a diagram illustrating an example of a disk format according to the second embodiment. Since FIGS. 1, 2, and 4 have already been described with respect to the first embodiment, repeated description is not necessary.

The optical disk data erasing apparatus 22 according to the second embodiment is provided with a judgement means for making a judgement as to whether the loaded optical disk 111 is a write-once optical disk (CD-R disk) or not; a disk recording information acquisition means for obtaining information relating to a data-recorded area or a data-unrecorded area (blank area) of the CD-R disk 111, on the basis of a disk recording information acquisition instruction from the host computer 21; a notification means for notifying the user of the disk recording information through the host computer 21; an erasing area detection means for detecting, when an instruction that specifies an area from which data are to be erased (hereinafter referred to as "an erasing area") is issued by the user through the host computer 21 on the basis of the disk recording information, an area corresponding to the specified erasing area; a determination means for determining whether data are recorded on the CD-R disk 111 or not, on the basis of the disk recording information; and a setting means with which the user sets, through the host computer 21, whether or not the interface bus is to be occupied during execution of data erasing.

Figure 6:
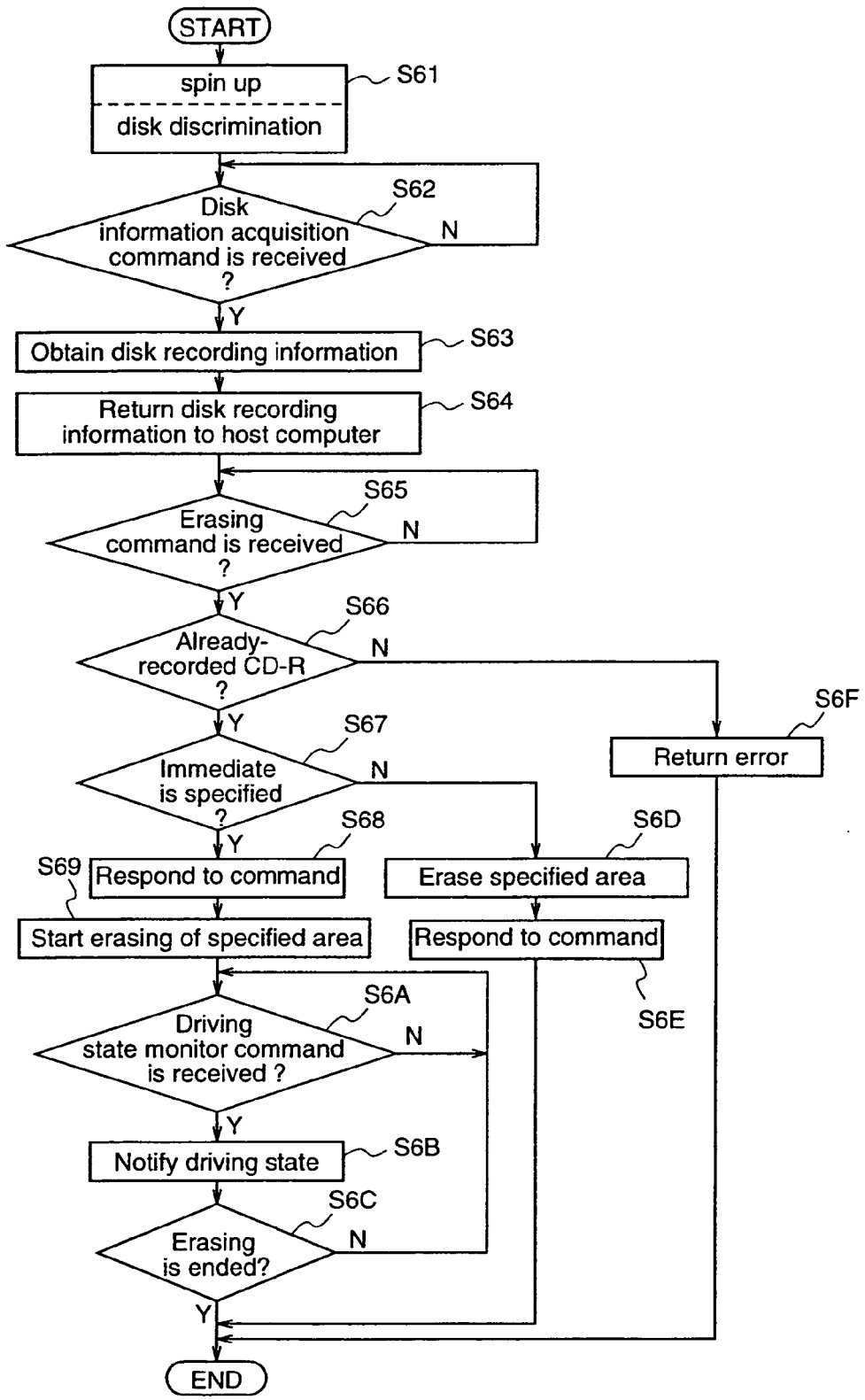
FIG. 6 is a flowchart illustrating the procedure of a data erasing method according to the second embodiment of the present invention.

Next, an optical disk data erasing method according to this second embodiment will be described with reference to FIG. 6.

When the optical disk 111 is loaded on the data erasing apparatus 22, initially, the CPU 101 controls the rotation control circuit 109 to spin up the motor 110 in step S61. Then, the loaded optical disk 111 is irradiated with a laser beam to read data recorded on the optical disk 111, and it is judged whether the optical disk 111 is a CD-R disk or not, on the basis of WOBBLE information which is obtained through the EFM WOBBLE signal processing circuit 105. When it is a CD-R disk, the process goes to step S62.

In step S62, it is checked whether or not the data erasing apparatus 22 receives a disk recording information acquisition command (a command of "Read Disk Information" or "Read Track Information") which is outputted from the host computer 21. When the apparatus 22 receives the command, the process goes to step S63.

In step S63, the disk recording information of the CD-R disk 111 is obtained. To be specific, the disk recording information is obtained as follows. Initially, the outline of the disk recording state is grasped on the basis of the information about the start time and end time of the already-recorded track and reserved track, which information is recorded in the PMA 42 at the inner circumference of the disk 111, and the TOC information which is recorded in the read-in area 43 of each session, and a break between pits of the data-recorded area and the data-unrecorded area is actually detected to recognize the details of the disk recording state, thereby obtaining the disk recording information.

Next, in step S64, the disk recording information adapted to the disk recording information acquisition command (a command of "Read Disk Information" or "Read Track Information") is returned to the host computer 21 to notify the user of the data recording information. Thereby, the user can specify a desired erasing area.

Next, in step S65, it is checked whether or not the data erasing apparatus 22 receives an erasing command which is outputted from the host computer 21. When the apparatus 22 receives the command, the process goes to step S66.

Next, in step S66, it is checked whether data have already been written in the loaded optical disk 111 or not. When the optical disk 111 is judged as an already-recorded CD-R disk, the process goes to step S67. Otherwise, the process goes to step S6F.

In step S6F, when the disk 111 is not an already-recorded CD-R disk, the erasing command becomes invalid, and an error signal indicating that the optical disk 111 is an inerasable disk is returned to the host computer 21. Since there is no need to execute data erasing when no data are recorded on the optical disk 111, needless operation is avoided, resulting in reduced cost.

In step S67, it is checked whether the disk erasing command indicates "Immediate" designating that the interface bus is not to be occupied or "Non Immediate" designating that the interface bus is to be occupied. In the case where the "Immediate" designating command is received, the process goes to step S68. In the case where the "Non Immediate" designating command is received, the process goes to step S6D.

In step S68, a response to the command is immediately returned to the host computer 21 to release the interface bus. Thereafter, in step S69, erasing of data in the specified area is started. In step S6A, it is checked whether or not the data erasing apparatus 22 receives a driving state monitor command such as "Test Unit Ready" or the like. When the apparatus 22 receives the command, the process goes to step S6B. In step S6B, it is notified to the host computer 21 that the data erasing state of the data erasing apparatus 22 is any of the following states: the state where data erasing is being executed, the state where data erasing has normally ended, and the state where the data erasing has abnormally ended. Then, as shown in step S6C, until the host computer 21 is notified by the data erasing apparatus 22 that the data erasing has normally ended or that it has abnormally ended, the host computer 21 continues to periodically output a driving state monitor command in step S6A. In this way, since the host computer 21 periodically checks the data erasing state to confirm the completion of data erasing, the host computer 21 can execute another processing while the data erasing apparatus 22 is executing data erasing.

In the case where the "Non Immediate" designating command is received, the process goes to step S6D wherein the data erasing apparatus 22 executes erasing of the specified area. Thereafter, in step S6E, the data erasing apparatus 22 outputs a response to the command, which indicates that the data erasing has normally ended or abnormally ended, to the host computer 21. Thereby, the host computer 21 can speedily detect the completion of data erasing.

In both of steps S69 and S6D, the erasing area specified by the erasing command is compared with the recording area obtained in step S63, and only the recording area corresponding to the specified erasing area is overwritten by irradiating the area with a laser beam having a recording power equal to or higher than that at recording, thereby erasing the recorded data.

In the optical disk data erasing apparatus according to the second embodiment, it is judged whether the loaded optical disk 111 is a write-once optical disk or not, and when the disk 111 is a write-once optical disk, overwriting of the optical disk 111 is carried out by irradiating the optical disk 111 with a laser beam having a recording power equal to or higher than that at recording, on the basis of a command from the host computer 21, thereby erasing the recorded data. Therefore, an optical disk data erasing apparatus, which is able to completely erase data recorded on an optical disk, can be realized easily, at low cost, without having to use a special apparatus and without generating substances detrimental to environment, whereby leakage of secret information can be prevented when the optical disk is discarded.

Furthermore, the data erasing apparatus 22 obtains disk recording information relating to a data-recorded area or a data-unrecorded area of the optical disk 111 when the host computer 21 outputs a disk recording information acquisition command. Therefore, the data erasing apparatus 22 can perform data erasing on only the data-recorded area without performing data erasing on the data-unrecorded area which needs not be erased, whereby the time required for data erasing is reduced.

Furthermore, the interface bus is to be occupied or not during execution of data erasing is set by the user through the host computer 21. Therefore, when it is set that the interface bus is not to be occupied, the host computer 21 can perform another processing while the data erasing apparatus 22 is executing data erasing. Further, when the interface bus is to be occupied, the host computer 21 can speedily detect the end of data erasing by the data erasing apparatus 22.

Embodiment 3

Hereinafter, an optical disk data erasing apparatus according to a third embodiment of the present invention will be described. FIG. 1 is a block diagram illustrating the construction of an optical disk data erasing apparatus according to the third embodiment. Since FIG. 1 has already been described with respect to the first embodiment, repeated description is not necessary.

The optical disk data erasing apparatus 22 according to the third embodiment is provided with a first jumper switch setting means for setting ON/OFF of a first jumper switch 32; a second jumper switch setting means for setting ON/OFF of a second jumper switch 33; a setting distinguishing means for distinguishing whether the first jumper switch 32 and the second jumper switch 33 are ON or OFF; a judgement means for judging whether the loaded optical disk 111 is a CD-R disk or not; an erasing means for erasing recorded data, on the basis of the setting of the first and second jumper switches 32 and 33; an ejection means for automatically ejecting the disk 111 after data erasing; a disk recording information acquisition means for acquiring information relating to a data-recorded area or a data-unrecorded area of the CD-R disk 111; and a determination means for determining whether data are recorded on the CD-R disk 111 or not, on the basis of the disk recording information obtained by the disk recording information acquisition means.

Figure 3A:
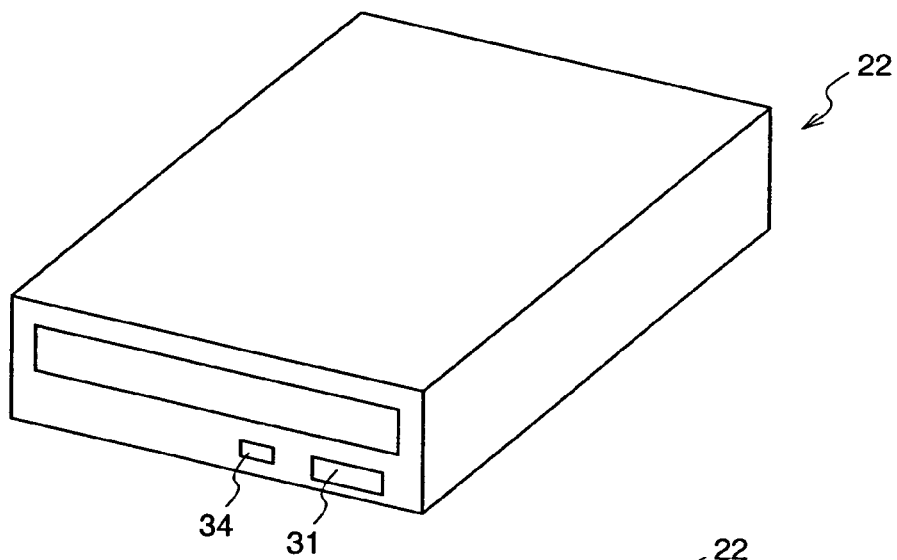
FIGS. 3(a) and 3(b) are a front view and a rear view, respectively, of a data erasing apparatus (drive) according to a third embodiment of the present invention.
Figure 3B:
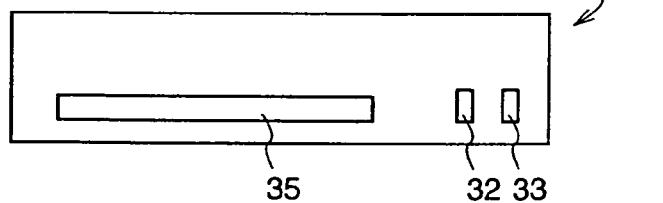

FIG. 3(a) shows a front view of the optical disk erasing apparatus 22 (drive), and FIG. 3(b) shows a rear view of the drive. In these Figures, 31 denotes an ejection button, 32 denotes a first jumper switch, 33 denotes a second jumper switch, 34 denotes an LED (Light Emitting Diode), and 35 denotes an interface connector.

The first jumper switch 32 indicates that the erasing operation is to be executed when it is ON, and the second jumper switch 33 indicates that the entire disk surface is to be erased when it is ON and that the recorded area in final session is to be erased when it is OFF.

The optical disk data erasing apparatus 22 according to the third embodiment automatically ejects the disk 111 and turns the LED 34 on when the first jumper switch 32 is OFF, or when it is recognized that the data erasing has not normally ended, or when it is determined that data are not recorded on the CD-R disk.

While in this third embodiment the LED 34 is turned on as a display means for indicating that data erasing is not carried out, the present invention is not restricted thereto, and other methods may be employed.

FIG. 4 shows an example of a disk format according to the third embodiment. Since FIG. 4 has already been described with respect to the first embodiment, repeated description is not necessary.

In FIG. 4, when the second jumper switch 33 is ON, overwriting is executed on an overwriting target area 1. Further, when the second jumper switch 33 is OFF, overwriting is executed on an overwriting target area 2.

Figure 7:
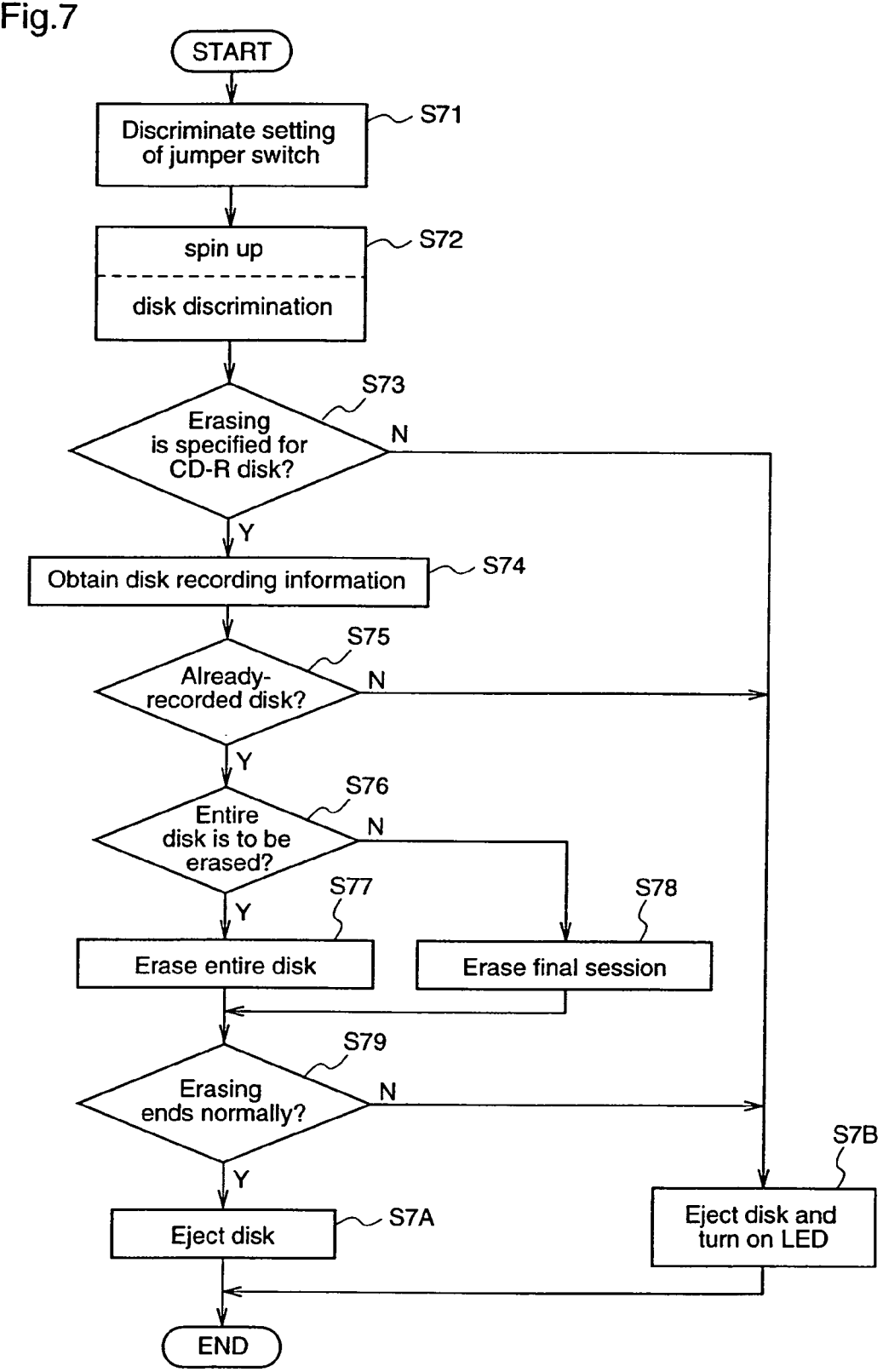
FIG. 7 is a flowchart illustrating the procedure of a data erasing method according to the third embodiment of the present invention.

Hereinafter, an optical disk data erasing method according to the third embodiment will be described with reference to FIG. 7.

Initially, in step S71, the optical disk data erasing apparatus 22 checks the states of the first and second jumper switches 32 and 33 on the rear surface of the drive when the power is turned on.

In step S72, the ejection button 31 is pushed down, whereby the CPU 101 operates the rotation control circuit 109 so as to spin up the motor 110 when the optical disk 111 is loaded on the data erasing apparatus 22. Then, the loaded optical disk 111 is irradiated with a laser beam to read data recorded on the optical disk 111, and WOBBLE information is extracted from the optical disk 111 by the EFM WOBBLE signal processing circuit 105. Then, it is judged whether the optical disk 111 is a CD-R disk or not on the basis of the extracted WOBBLE information, followed by step S73.

In step S73, when it is confirmed in step S71 that the jumper switch 32 is ON (designation of erasing operation) and it is confirmed in step S72 that the optical disk 111 is a CD-R disk, the process goes to step S74. Otherwise, the process goes to step S7B.

In step S74, the disk recording information of the CD-R disk 111 is obtained.

To be specific, the disk recording information is obtained as follows. That is, an outline of the disk recording state is grasped on the basis of the information about the start time and end time of an already-recorded track and a reserved track, which is recorded in the PMA 42 at the inner circumference of the disk 111, as well as the TOC information which is recorded in the read-in area 43 of each session, and a break of pits between the recorded area and the unrecorded area is detected actually to recognize the details of the disk recording state, thereby obtaining the disk recording information. Therefore, the data erasing apparatus 22 can perform data erasing on only the data-recorded area without performing data erasing on the data-unrecorded area which needs not be erased, whereby the time required for data erasing is reduced.

In step S75, it is checked whether data have already been recorded on the optical disk 111 or not. When data have already been recorded on the disk 111, the process goes to step S76. Otherwise, the process goes to step S7B.

In step S76, the setting of the second jumper switch 33 is checked. When the second jumper switch 33 is set in the ON state, the process goes to step S77, wherein the entire surface of the disk is subjected to data erasing. When the second jumper switch 33 is in the OFF state, the process goes to step S78, wherein the data-recorded area in the final session is subjected to data erasing.

In both of steps S77 and S78, the erasing area specified by the erasing command is compared with the recording area obtained in step S74, and only the recording area corresponding to the specified erasing area is overwritten by irradiating the area with a laser beam having a recording power equal to or higher than that at recording, thereby erasing the recorded data.

In step S79, it is checked whether the data erasing executed in steps S77 and S78 has normally ended or not. When the data erasing has normally ended, the data-erased optical disk 111 is automatically ejected in step S7A.

When the disk 111 loaded in step S75 is other than the already-recorded CD-R disk or when the data erasing process has abnormally ended in steps S77 and 78, the disk is automatically ejected in step S7A, and the LED 34 is turned on to notify the user that the data erasing ends in failure.

When the optical disk data erasing apparatus 22 is connected to an auto changer, the effectiveness of the data erasing apparatus 22 relating to automation of erasing work and cost-down is enhanced.

In the optical disk data erasing apparatus according to the third embodiment, after ON/OFF of the first and second jumper switches 32 and 33 are set and the loaded optical disk is judged as a CD-R disk, overwriting of the optical disk 111 is executed by irradiating the optical disk with a laser beam having a recording power equal to or higher than that at recording, according to the setting of the first and second jumper switches 32 and 33, thereby erasing the recorded data. After the data erasing, the optical disk 111 is automatically ejected. Therefore, erasing of data on the optical disk can be executed by the optical disk data erasing apparatus 22 alone, according to the external operation, without using the host computer, and the erasing process can be automated. As the result, an optical disk data erasing apparatus which is able to completely erase recorded data easily, at low cost, whereby leakage of secret information is prevented when the optical disk is discarded.

Further, when the loaded optical disk 111 is not a CD-R disk, or when the first jumper switch 32 is OFF and the erasing operation is not set, or when the data erasing of the optical disk 111 has not normally ended, the loaded optical disk 111 is automatically ejected and the LED 34 is turned on. Therefore, the user can know that the data erasing ends in failure, whereby the user is prevented from recognizing that the data erasing has normally ended, and from discarding the optical disk on which the recorded data to be erased is not erased.

What is claimed is:
1. An optical disk data erasing method comprising:
a first jumper switch setting operation of setting a first jumper switch to ON or OFF;

a setting identification operation of identifying the setting of the first jumper switch;

a judgement operation of making a judgement as to whether or not a loaded optical disk is a write-once optical disk;

an erasing operation of overwriting the write-once optical disk by irradiating the write-once optical disk with a laser beam having a same recording power as that at recording, according to the setting of the first jumper switch, thereby erasing data recorded on the write-once optical disk; and an ejection operation of automatically ejecting the optical disk after the data erasing process, wherein when the first jumper switch is set to ON, said erasing operation starts the data erasing process, and when the first jumper switch is set to OFF or when said judgement operation judges that the loaded optical disk is not a write-once optical disk, said ejection operation automatically ejects the optical disk, and a displaying operation displays that the data erasing process has not been executed on the optical disk.

2. An optical disk data erasing method as defined in claim 1, further comprising:

a checking operation of checking whether or not the data erasing process has ended normally;

wherein, when the data erasing process for the write-once optical disk has not ended normally, said ejection operation automatically ejects the write-once optical disk, and the display operation displays that the data erasing process has not been executed on the write-once optical disk.

3. An optical disk data erasing method as defined in claim 2, further comprising:

a second jumper switch setting operation of setting a second jumper switch to ON or OFF, wherein said setting identification operation also includes identifying the setting of the second jumper switch, when the second jumper switch is set to ON, said erasing operation executes the data erasing process over an entire surface of the optical disk, and when the second jumper switch is set to OFF, said erasing operation executes the data erasing process on a final session of the optical disk.

4. An optical disk data erasing method as defined in claim 1, further comprising:

a disk recording information acquisition operation of acquiring information relating to a data-recorded area or a data-unrecorded area of the write-once optical disk, wherein said erasing operation erases data recorded in the data-recorded area of the write-once optical disk.

5. An optical disk data erasing method as defined in claim 4, further comprising:

a determination operation of determining whether or not data are recorded on the write-once optical disk, on the basis of the information obtained in said disk recording information acquisition operation, wherein when data are recorded on the write-once optical disk, said erasing operation erases the recorded data, and when no data are recorded on the write-once optical disk, said ejection operation automatically ejects the write-once optical disk, and the display operation displays that the data erasing process has not been executed on the write-once optical disk.

6. An optical disk data erasing method comprising:

a first jumper switch setting operation of setting a first jumper switch to ON or OFF;

a setting identification operation of identifying the setting of the first jumper switch;

a judgement operation of making a judgement as to whether or not a loaded optical disk is a write-once optical disk;

an erasing operation of overwriting the write-once optical disk by irradiating the write-once optical disk with a laser beam having a recording power higher than that at recording, according to the setting of the first jumper switch, thereby erasing data recorded on the write-once optical disk; and an ejection operation of automatically ejecting the optical disk after the data erasing process, wherein when the first jumper switch is set to ON, said erasing operation starts the erasing process, and when the first jumper switch is set to OFF or when said judgement operation judges that the loaded optical disk is not a write-once optical disk, said election operation automatically ejects the optical disk, and a display operation displays that the data erasing process has not been executed on the optical disk.

7. An optical disk data erasing method as defined in claim 6, further comprising:

a checking operation of checking whether or not the data erasing process has ended normally, wherein, when the data erasing process for the write-once optical disk has not ended normally, said ejection operation automatically ejects the write-once optical disk, and the display operation displays that the data erasing process has not been executed on the write-once optical disk.

8. An optical disk data erasing method as defined in claim 7, further comprising:

a second jumper switch setting operation of setting a second jumper switch to ON or OFF, wherein said setting identification operation also includes identifying the setting of the second jumper switch, when the second jumper switch is set to ON, said erasing operation executes the data erasing process over an entire surface of the optical disk, and when the second jumper switch is set to OFF, said erasing operation executes the data erasing process on a final session of the optical disk.

9. An optical disk data erasing method as defined in claim 6, further comprising:

a disk recording information acquisition operation of acquiring information relating to a data-recorded area or a data-unrecorded area of the write-once optical disk, wherein said erasing operation erases data recorded in the data-recorded area of the write-once optical disk.

10. An optical disk data erasing method as defined in claim 9, further comprising:

a determination operation of determining whether or not data are recorded on the write-once optical disk, on the basis of the information obtained in said disk recording information acquisition operation, wherein when data are recorded on the write-once optical disk, said erasing operation erases the recorded data, and when no data are recorded on the write-once optical disk, said ejection operation automatically ejects the write-once optical disk, and the display operation displays that the data erasing process has not been executed on the write-once optical disk.

* * * * *